United States Patent [19]

Tsuchiya et al.

[11] 4,265,922
[45] May 5, 1981

[54] INDUCTION HEATING METHOD FOR PROCESSING FOOD MATERIAL

[75] Inventors: Takuzo Tsuchiya, Minneapolis; Jin-Liou Fang, New Hope; Glen Rasmussen, Champlin, all of Minn.

[73] Assignee: General Mills, Inc., Minneapolis, Minn.

[21] Appl. No.: 8,219

[22] Filed: Jan. 31, 1979

[51] Int. Cl.³ .............................................. A23L 101
[52] U.S. Cl. .................................. 426/520; 99/323.4; 99/DIG. 14; 219/10.41; 219/10.49 R; 219/10.69; 426/244; 426/445; 426/446
[58] Field of Search .............. 426/520, 523, 445, 446, 426/234, 244; 219/10.73, 10.69, 10.67, 10.71, 10.41, 10.43, 10.57, 10.49; 99/DIG. 14, 323.4; 34/1

[56] References Cited

U.S. PATENT DOCUMENTS

| | | | |
|---|---|---|---|
| 1,110,754 | 9/1914 | Duryea | 426/244 |
| 2,344,754 | 3/1944 | Vang | 219/10.73 |
| 2,450,623 | 10/1948 | Anderson | 99/DIG. 14 |
| 2,802,084 | 8/1957 | Marklew | 219/10.67 |
| 2,910,565 | 10/1959 | Osborn, Jr. et al. | 219/10.41 |
| 3,226,465 | 12/1965 | Downing et al. | 219/10.49 |
| 3,971,303 | 7/1976 | Dahl | 99/323.4 |
| 3,980,854 | 9/1976 | Berkman et al. | 219/10.49 |
| 4,039,794 | 8/1977 | Kasper | 219/10.69 |
| 4,120,981 | 10/1978 | Burkhart | 426/523 |

Primary Examiner—Joseph M. Golian
Assistant Examiner—George C. Yeung
Attorney, Agent, or Firm—G. O. Enockson; L. M. Lillehaugen; S. R. Peterson

[57] ABSTRACT

An elongated treating chamber in the form of a cylindrical metallic barrel is rotatable about an inclined longitudinal axis. The food material to be processed is introduced into the inlet or higher end of the barrel through the agency of a rotary valve and is removed or discharged through a nozzle at the other or lower end. In one embodiment two solenoid-type induction coils encircle longitudinal portions of the barrel, being energized with alternating current power so as to inductively heat the barrel. The heat is induced throughout the thickness of the wall of the barrel and is then transmitted into the food material as the food material passes therethrough. The temperature of the barrel's outer surface is sensed at two longitudinally spaced locations as the barrel rotates and each of the two induction coils is individually controlled in accordance with the temperature that is desired. The coil nearer the discharge end can be energized with more current than the other coil, thereby permitting the discharge end of the barrel, where there is more food material, to be heated to a greater degree than the inlet end. In a second embodiment, only one solenoid coil is utilized, and the pitch of the coil turns constituting such coil are varied, the turns being closer together at the discharge end where a greater amount of heat is needed than at the inlet end.

5 Claims, 6 Drawing Figures

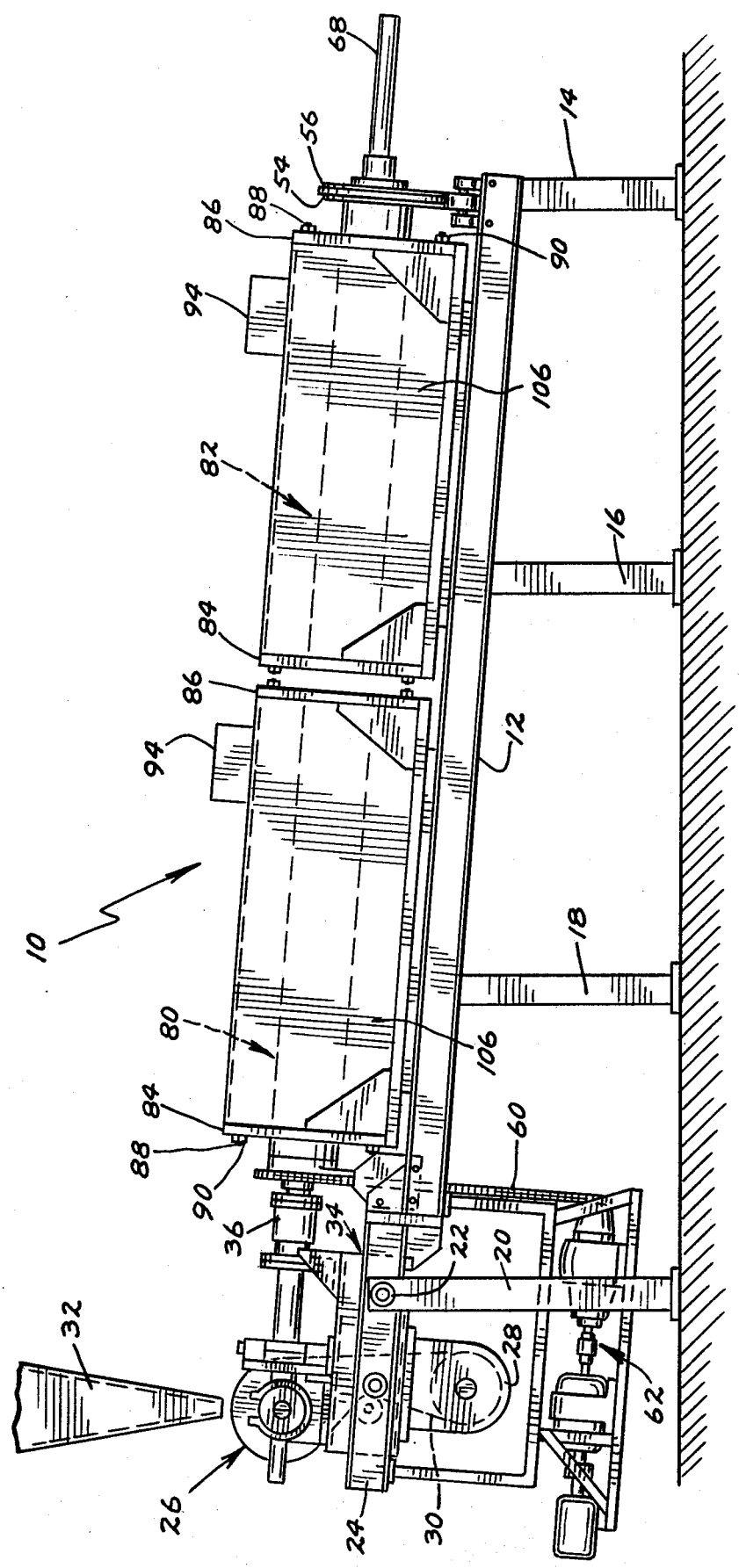

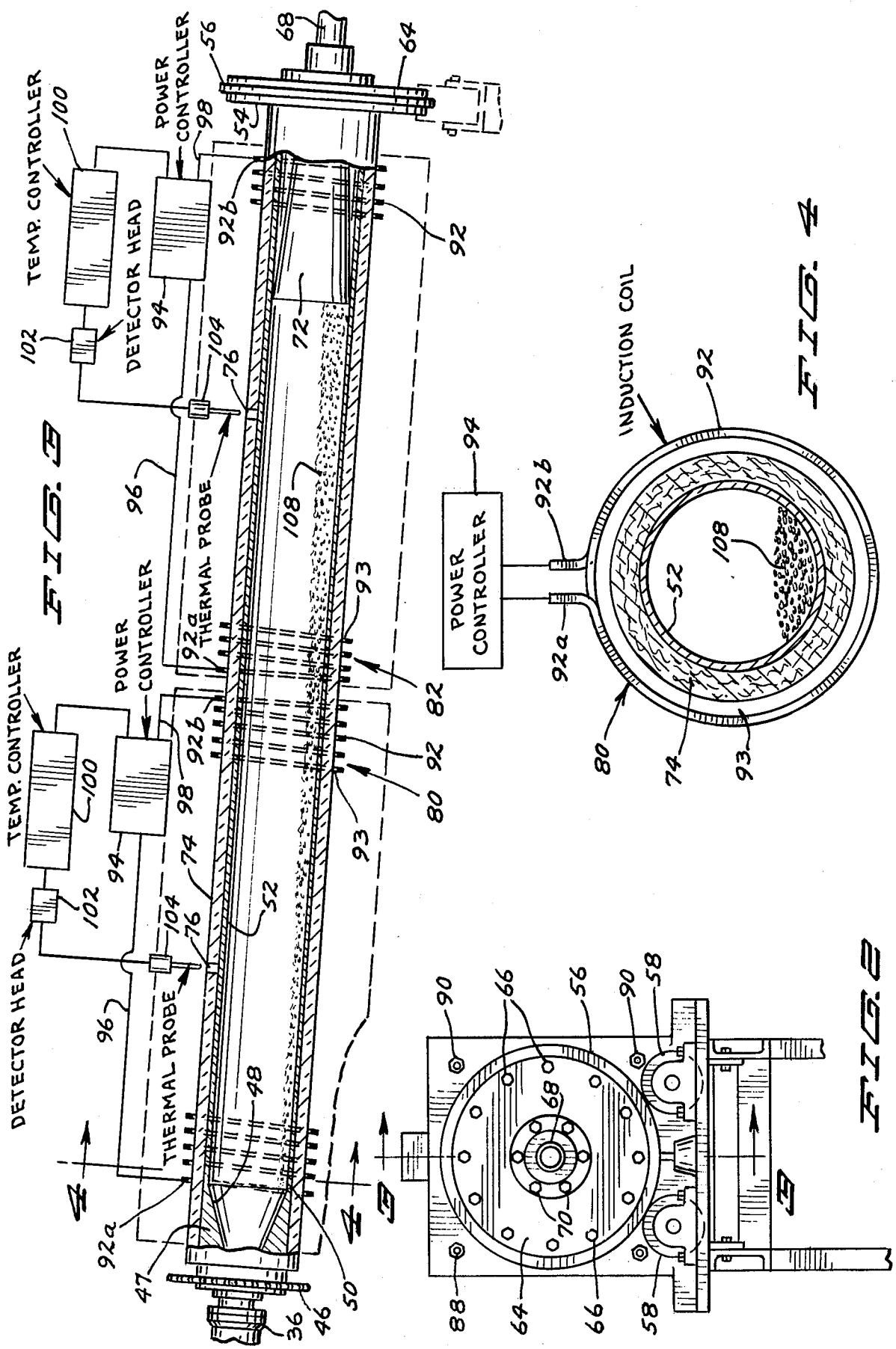

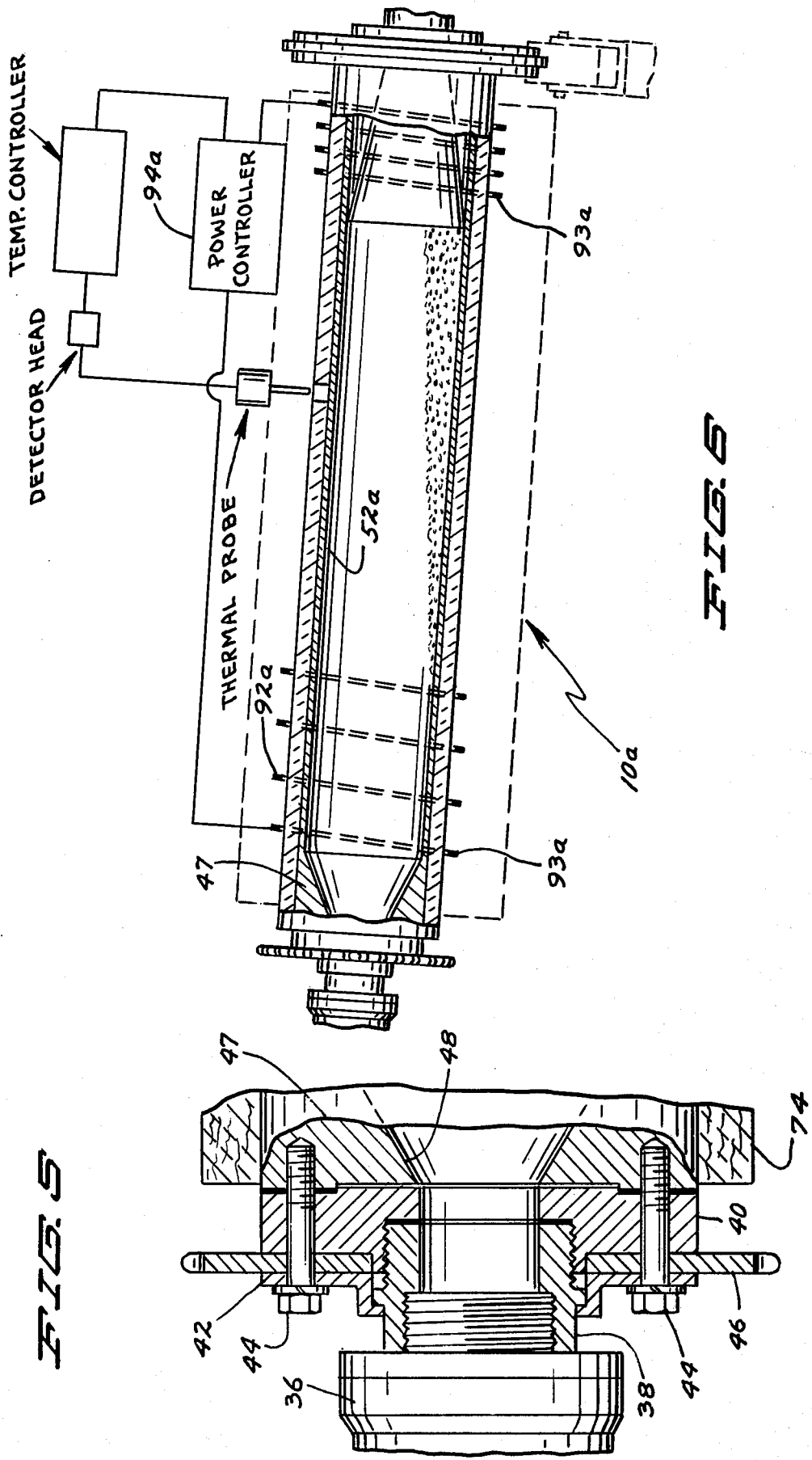

INDUCTION HEATING METHOD FOR PROCESSING FOOD MATERIAL

BACKGROUND OF THE INVENTION

1. Field of the Invention

The present invention relates generally to the treating or processing of food material under heat and pressure, and pertains more particularly to an induction heating method and apparatus for heating the food material as it passes through a rotating treating chamber in the form of an inclined metallic barrel.

2. Description of the Prior Art

In U.S. Pat. No. 3,231,387, granted on Jan. 25, 1966 to Takuzo Tsuchiya et al for "Method and Apparatus for Continuous Puffing" it is pointed out that various methods and devices have previously been suggested for puffing different materials. The method and apparatus described in said Tsuchiya patent, however, is believed to be the closest prior art. The alluded-to patent is assigned to the same assignee as the present application.

Although the invention described in the foregoing patent has proved to be very satisfactory throughout the years, nonetheless a present-day shortcoming is the reliance upon gas burners for heating the elongated treating chamber or barrel.

THE PRESENT INVENTION

The herein described invention is concerned with the induction heating of the elongated treating chamber or barrel through which the food material continuously passes during the treatment thereof to achieve the desired puffing of the product at the discharge end of the barrel. Accordingly, the invention has for a general object the utilization of induction heating in a highly effective manner for the processing of food material.

A more specific object of the invention is to realize a more uniform heating of the barrel than heretofore.

Another object is to provide an increased thermal efficiency, particularly inasmuch as the invention permits the use of insulation on the barrel itself, which has not before been possible. An aim of the invention is also to eliminate heat reflectors as used in the past.

A further object of the invention is to provide for rapid cold starts.

Still another object is to provide an automatic temperature control capable of rapidly correcting for temperature changes.

The invention has for another object the accurate control of temperature, as far as maintaining a specific or desired temperature is concerned.

A further object is to provide high heating rates.

Also, another object is to provide apparatus having a high degree of reliability and which can be easily maintained.

Another object of the invention is to provide apparatus that requires no ventilation because there are no products of combustion to get rid of as when utilizing gas burners.

Further, an object of the invention is to provide a barrel for continuously puffing food products that can have a shorter length than previously.

Still another object is to avoid distortion of the elongated treating chamber or metal barrel in case of power failure, more specifically a longitudinal bowing or warping of this cylindrical member.

Briefly, our invention utilizes induction heating for uniformly heating the metallic barrel through which food material is being advanced. More specifically, the invention envisages the use of one or more induction coils which encircle the barrel in a circumferentially spaced relationship therewith, thereby permitting the barrel and the thermal insulation encasing same to be rotated as a unit while the heat is being derived through the appropriate energization of the coil or coils with alternating current. In one embodiment, two identical coils are employed and the power delivered to each coil is controlled individually so that one coil can impart or induce a greater amount of heat in one portion of the barrel with which it is associated than the other coil induces in that portion of the barrel it encircles. In a second embodiment, a single coil is contemplated but with a coil pitch varying from one end to the other so that a greater amount of heat can be induced in the end of the barrel where the coil turns are closer to each other than at the other end where the turns are farther apart.

BRIEF DESCRIPTION OF THE DRAWINGS

FIG. 1 is a side elevational view of apparatus embodying our invention therein;

FIG. 2 is an end view taken from the right in FIG. 1;

FIG. 3 is a longitudinal sectional view taken in the direction of line 3—3 of FIG. 2, the view being on a slightly smaller scale and omitting the casing and the coil supports;

FIG. 4 is a sectional view taken in the direction of line 4—4 of FIG. 3;

FIG. 5 is an enlarged detail sectional view depicting the construction employed at the inlet end of the barrel and which construction permits the barrel to be fully inserted within the coils, and FIG. 6 is a sectional view corresponding generally to FIG. 3 but depicting a different embodiment making use of a varying pitch coil.

DESCRIPTION OF THE PREFERRED EMBODIMENTS

One embodiment exemplifying our apparatus has been pictured in FIG. 1, the apparatus having been denoted generally by the reference numeral 10. It will be seen that a frame 12 is employed having several longitudinally spaced pairs of laterally spaced legs denoted by the reference numerals 14, 16 and 18. An additional pair of legs 20 have also been employed, there being a pivot pin 22 at the top of each one of these legs 20 which connects with an extension or platform 24 that is fixedly attached or fastened to the frame 12.

The extension or platform 24 supports a so-called port valve assembly indicated generally by the reference numeral 26. An electric motor 28 via a drive chain 30 operates the port valve assembly 26. Superimposed above the inlet to the port valve assembly 26 is a hopper 32 that contains therein the food material that is to be continuously puffed by the apparatus 10. Inasmuch as the port valve assembly 26 is fully described in Kenneth J. Valentas et al application, Ser. No. 785,140, filed Apr. 6, 1977 for "Apparatus and Method for Processing Food Material Utilizing Out-Of-Phase Feeding to a Treating Chamber", the said application being assigned to the same assignee as the present application, no need is seen for describing the assembly 26 with any greater degree of particularity at this time.

Continuing with the description of the apparatus 10, a rotary union mount 34 is supported on the frame extension or platform 24. Attached to the mount 34 is a rotary union 36. As best understood from FIG. 5, a rotary union coupling 38 extends from the union 36, being threadedly connected thereto. A rotary union flange 40 is mechanically connected to the coupling 38 via locking ring 42. More specifically, a plurality of bolts 44 extend through the locking ring 42, a sprocket 46 and the flange 40 into a cylindrical head 47 having a tapered passage 48 extending therethrough.

The head 47 is welded at 50 to one end of an elongated treating chamber or metal barrel labeled 52. The inlet end of the barrel 52 having the head 47 attached thereto is rotatably supported by means of the rotary union 36. The other or discharge end of the barrel 52 is rotatably supported through the agency of an annular plate 54 welded to this end of the barrel and having a track 56 thereon which rotatably rides on two laterally spaced rollers 58, as best viewed in FIG. 2. The rollers 58 are at a lower elevation with respect to that of the union 36, so as to impart an inclination to the barrel 52.

In order to rotate the barrel 52, chain 60 extends about the sprocket 46, the chain 60 being driven by a motor-gear drive unit denoted generally by the reference numeral 62.

A flange 64 is secured to the annular plate 54 via a plurality of bolts 66. A discharge tube 68 is in turn attached to the flange 64 by additional bolts 70. For the sake of completeness, a cone 72 has been shown in FIG. 3, the cone 72 narrowing toward the right where it connects with a discharge nozzle (not shown) leading directly into the tube 68. Actually, the discharge nozzle, a gun barrel corresponding to the barrel 52 and other details, are aptly depicted in said Tsuchiya et al patent.

At this time attention is directed to a layer 74 of insulation, such as fiberglass batting, that encircles the outer surface of the barrel 52. For a purpose presently to become clear, a pair of radially directed openings or holes 76 are formed in the insulation so as to expose small surface areas of the metal barrel 52.

At this time attention is directed to two induction coil units 80, 82. Included in these units 80, 82 are end plates 84 and 86. Extending between the end plates are tie rods 88 having nuts 90 thereon. Each unit 80, 82 includes a solenoid-type induction coil 92 that circumscribes the insulation 74, being spaced radially therefrom, as indicated by the reference numeral 93 in FIGS. 3 and 4, so as not to interfere with the rotation of the barrel 52. It will be appreciated that each unit 80 and 82 includes a set of the tie rods 88 which pull the various turns or convolutions of each coil 92 against dielectric shims (not visible) so as to maintain a uniform spacing of the coil turns relative to each other, as well as anchoring the coil 92. The ends of the tie rods 88 and the nuts 90 thereon for the coil unit 82 are best seen in FIG. 2. However, the ends of the tie rods 88 and the nuts 90 for both units 80, 82 are visible in FIG. 1; in actual practice, the tie rods 88 for the unit 80 are angularly offset or displaced from those of the unit 82, so that the nearer ends of the units 80, 82 are quite close together—closer than that depicted in FIG. 1. Actually, the manner in which the coils 92 are braced or supported is conventional and need not be described with any degree of specificity. Therefore, and also for drafting simplicity, the means for supporting the coils 92, which has been generally alluded to above, has been completely omitted from FIG. 3. It can be explained at this stage, though, that the barrel 52 can be inserted through the coils 92 from the right to the left by first removing the sprocket 46, the bolts 48 enabling this to be done.

In order to energize the coil 92 of each coil unit 80, 82, a power controller 94 is employed for each coil. Such controllers 94 are preferably of the solid state type, such as the SCR controller manufactured by Halmar, Inc., 1544 W. Mound Street, Columbus, Ohio 43223, model PAW 1. The coil ends or terminals of the coils 92 have been labeled 92a, 92b, and conductors 96, 98 connect the power controllers 94 to the coil ends or terminals 92a, 92b. The lines connecting the power controllers 94 to an appropriate source of AC power have not been shown, however. It should be appreciated that conventional 60 Hz power is employed and that no frequency conversion equipment is needed. The use of 60 Hz is important in order to obtain an optimum degree of penetration, as far as the induced currents are concerned. Higher frequencies result in a skin effect that does not produce as efficient heating as the 60 Hz where the metal wall thickness is on the order of ⅜ inch (or even greater), this wall thickness having been the thickness employed in actual practice. Stated more broadly, the choice of frequency is dependent upon the wall thickness of the barrel.

The power controllers 94 are connected to temperature controllers 100, such as the type manufactured by Ircon, Inc., 7555 North Linder Avenue, Skokie, Illinois 60076, and referred to as No. 6000, which are in turn connected to detector heads 102, also manufactured by Ircon. Each detector head 102 has a thermal probe 104 connected thereto which may be of the optical fiber type, such as that manufactured by Vanzetti Infrared & Computer Systems, Inc., 607 Neponset Street, Canton, Massachusetts 02021. The infrared energy sensed by the probes 104 is transmitted to the respective detector heads 102.

It will now be recognized that the two probes 104 are mounted so as to be in registry with the holes or openings 76 once each revolution of the barrel 52. In this way, the temperature of the barrel 52 is monitored once during each revolution by the probes 104 and any required change in energization of the coils 92 can then be individually effected by means of either or both, as the case may be, of the power controllers 94 which are controlled by the temperature controller 100. It should be evident that the power being supplied to the induction coil unit 82 can be greater than that supplied to the induction coil unit 80, because each temperature controller 100 can be set for different temperatures.

In practice a casing or shield 106 is placed over the coil units 80, 82. Such casing or shield 106 plays no role as far as the invention is concerned other than to protect the apparatus 10 from personnel that might be working in the vicinity of the apparatus.

Having presented the foregoing description, the manner in which our apparatus functions should be readily understood. Nonetheless, a brief description of the operation should help in appreciating to the fullest extent the benefits to be derived from a practicing of our invention. In this regard, the rotary valve assembly 26 receives the food material to be puffed from the hopper 32 located thereabove. As explained in the afore-said patent application, the port valve assembly 26 receives the food material from the hopper 32 when one of its pockets is at an uppermost position and the loaded pocket is moved through 90° into alignment with the barrel 52 where the pocket is subjected to steam pressure with the consequence that the food material is forced from the pocket in which it has been received into the inlet end of the barrel 52.

The resulting food bed within the pressurized barrel 52 has been indicated generally by the reference numeral 108. However, the agitation and stirring of the food material does not, strictly speaking, pictorially correspond to the bed 108 of such material illustrated in FIG. 3. Nonetheless, it can be appreciated that the food material passes through the pressurized barrel 52, as more fully explained in said Tsuchiya et al patent, assisted in doing so by the slight inclination of the barrel, and is discharged through the tube 68 at the right.

It is necessary to maintain the barrel 52 at an elevated temperature as the food material 108 moves therethrough. Heretofore, a series of burners located immediately beneath the barrel have been employed. Such an arrangement is presented in said Tsuchiya et al patent. However, gas burners heat only one portion of the barrel, more specifically, the bottom portion thereof and even though the barrel is rotated in the prior art arrangement, the heat is directed only to the underside of the barrel 52 and not uniformly against its cylindrical surface. This has posed a severe warping or bowing problem in the past when the barrel is heated with gas burners, distortion of this character occurring when the rotation of the barrel is suddenly interrupted or stopped such as caused by a power failure. During a normal shutdown, when using gas heating, the rotation of the barrel must be continued until the heated barrel has cooled sufficiently to avoid the above-mentioned warping or bowing. It, therefore, should be apparent that residual heat has been a problem.

Obviously, no insulation can encircle the barrel as far as the prior art is concerned, for this would prevent the heat from the burners from reaching the barrel. However, as far as the present invention is concerned, better thermal efficiency can be realized by reason of the layer of thermal insulation which in no way interferes with the electromagnetic action of the coils 92. Furthermore, since when practicing our invention there are no products of combustion, there is no need for an exhaust or ventilating system, which can be costly to install and operate.

Energization of the coil 92 of each coil unit 80, 82 with alternating current power induces currents throughout the metal wall constituting the barrel 52. Induction heating involves not only the generation of eddy currents, but also hysteresis losses. The point to note, though, is that the heat is induced throughout the entire circumference and length of the barrel 52, and by using 60 Hz as the frequency a deeper penetration of the flux or magnetic effect is realized when the barrel 52 has a thickness of $\frac{3}{8}$ inch or greater.

As mentioned in said Tsuchiya et al patent, the food material slides and rolls along the barrel. It is also pointed out in said patent that the relative processing contributions result respectively from contact of the material with the turbulent fluid (mainly steam), from conduction during contact with the heated barrel, and from radiation from the heated barrel walls. Thus, it will be appreciated that a more uniformly heated barrel will result in a better heated food product passing therethrough, which the present invention achieves.

Not only can the temperature be controlled at an optimum or preferred level but it can be modified toward the discharge end by simply energizing the coil 92 of the unit 82 with a greater amount of power. It will be appreciated that the power controllers 94 are preferably of a solid state character and will involve silicon controlled rectifiers or their equivalent, it being only necessary to cause conduction of such elements earlier in each cycle in order to increase the power supplied to the coil 92 of the unit 82 and consequently induce a greater amount of heat in that portion of the barrel 52 toward the discharge end thereof. From FIG. 3 it will be discerned and appreciated that the bed 108 of food material is deeper at this end, thereby normally requiring, or at least making it more desirable to have, a greater amount of heat in this region.

Inasmuch as a greater amount of heat is normally desirable toward the discharge end of the barrel 52, a second embodiment has been depicted in FIG. 6. Inasmuch as the apparatus appearing in FIG. 6 is basically similar to the apparatus 10 of FIG. 3, it has been distinguished by the suffix a. Basically, the barrel 52a is somewhat larger in diameter than the barrel 52 and can also be somewhat shorter.

What is important as far as the apparatus 10a is concerned is that the single coil 92a is not of uniform pitch, the turns or convolutions thereof being closer together adjacent the discharge end than at the inlet end of the barrel 52a. Thus, the greatest amount of heat is induced in the region immediately adjacent the discharge end of the barrel 52a and the amount of heat being induced is gradually decreased toward the inlet end of the barrel 52a by virtue of the greater spacing between adjacent turns.

Consequently, whereas the thermal probe 104a senses the temperature of the barrel 52a just as the probes 104 detect the temperature of the barrel 52, any adjustment of the power being furnished by the controller 94a is always such that the change in heat will be more pronounced toward the discharge end than at the inlet end.

We claim:

1. A method of processing food material comprising the steps of rotating a metallic barrel, introducing the food material into one end of said barrel, discharging said food material from the other end of said barrel, and inductively heating at a relatively low frequency at least a portion of said barrel as it rotates so that heat is first induced in said barrel and is then transmitted by conduction from said barrel into said food material as said food material passes through said barrel, said barrel being rotated within a pair of solenoid-type coils to provide said inductive heating and including the step of individually energizing said coils.

2. The method of claim 1 in which the coil nearer said other end is energized with a greater amount of power than the coil nearer said one end of the barrel.

3. The method of claim 2 in which said barrel is rotated about an inclined axis with said other end of said barrel being lower than said one end thereof.

4. A method of processing food material comprising the steps of rotating a metallic barrel, introducing the food material into one end of said barrel, discharging said food material from the other end of said barrel, and inductively heating at a relatively low frequency at least a portion of said barrel as it rotates so that heat is first induced in said barrel and is then transmitted by conduction from said barrel into said food material as said food material passes through said barrel, said barrel being rotated within at least one solenoid-type coil having a varying pitch to provide said inductive heating and the turns of said coil being closer together nearer said other end than said one end.

5. The method of claim 4 in which said barrel is rotated about an inclined axis with said other end of said barrel being lower than said one end thereof.

* * * * *

UNITED STATES PATENT AND TRADEMARK OFFICE
CERTIFICATE OF CORRECTION

PATENT NO. : 4,265,922
DATED : May 5, 1981
INVENTOR(S) : Takuzo Tsuchiya, Jin-Liou Fang, Glenn Rasmussen It is certified that error appears in the above—identified patent and that said Letters Patent are hereby corrected as shown below:

Column 3, line 5; "via locking" should be --- via a locking ---,
line 21; "barrel 52, chain 60" should be
--- barrel 52, a chain 60 ---.

Signed and Sealed this

Twentieth Day of October 1981

[SEAL]

Attest:

GERALD J. MOSSINGHOFF

Attesting Officer    Commissioner of Patents and Trademarks